United States Patent Office 2,931,150
Patented Apr. 5, 1960

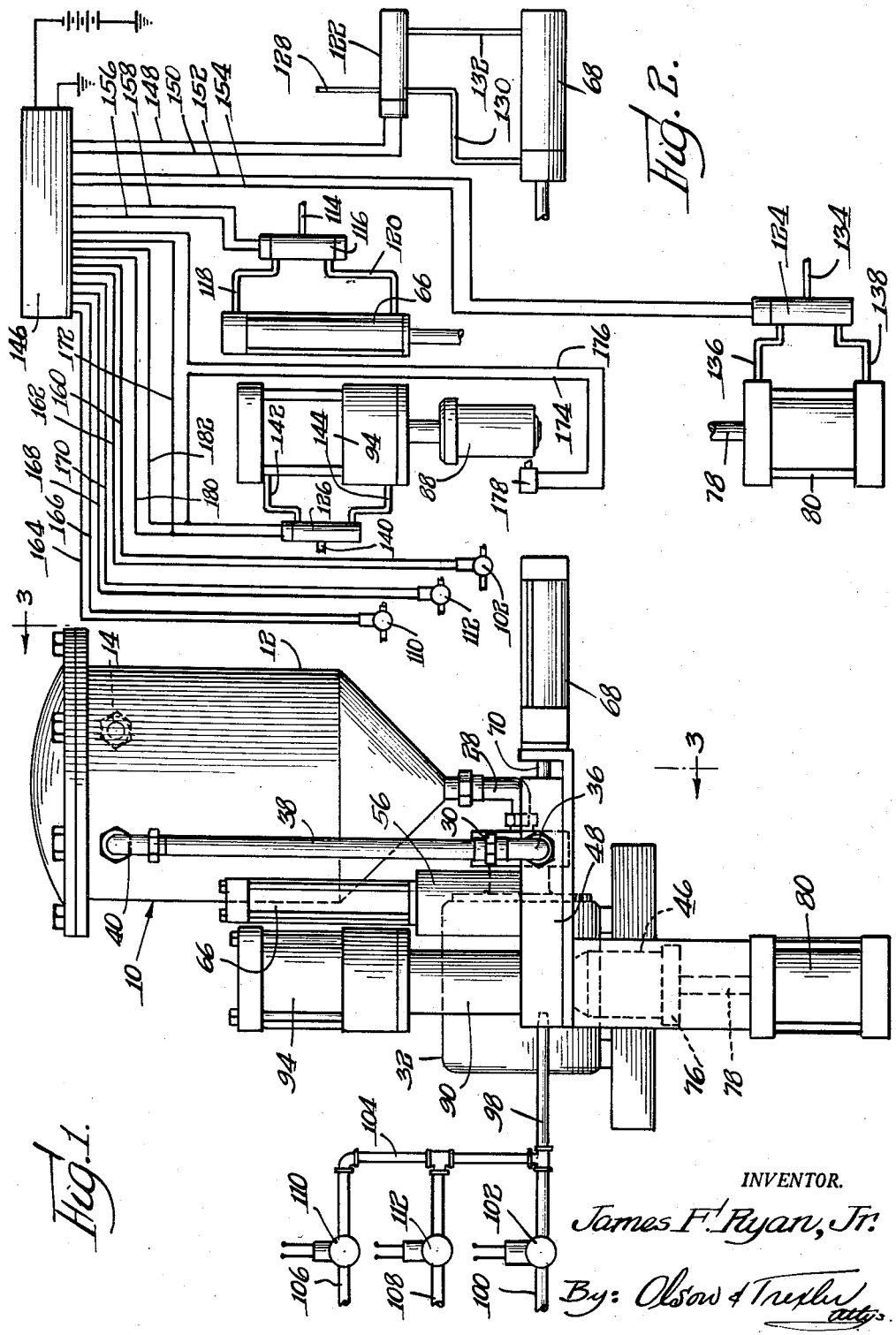

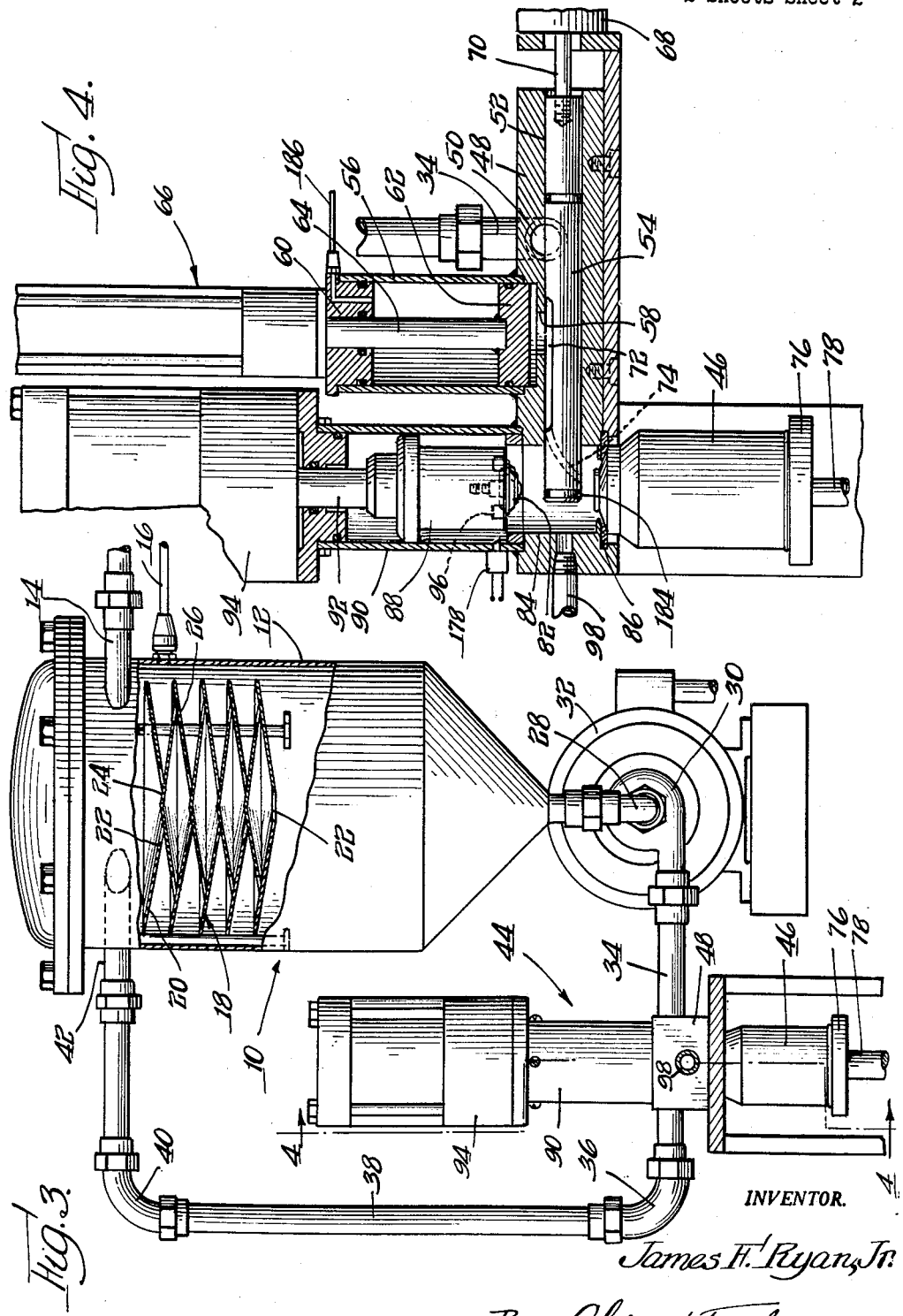

2,931,150

APPARATUS FOR PACKAGING A LIQUID UNDER PRESSURE

James F. Ryan, Jr., Castro Valley, Calif., assignor to W. F. and John Barnes Company, Rockford, Ill., a corporation of Illinois Application March 6, 1956, Serial No. 569,907

6 Claims. (Cl. 53—112)

The present invention relates to a novel method and apparatus for packaging a liquid product in a pressurized container, and while it will become apparent that various liquid products may be packaged in containers of various types in accordance with the present invention, the invention has particular utility for and will be described with particular reference to the packaging of cream products or the like in pressurized dispensing containers.

Packages for automatically dispensing whipped cream or the like are well known, and heretofore it has been customary to process such packages by first filling a container or can with a cream product or the like, then sealing a closure on the can and then applying gas under pressure to the container through a dispensing valve while, at the same time, shaking the container. This process is time consuming and, therefore, expensive and requires the use of a large and complicated shaking and gas applying machine. Also, the shaking action may cause the cream to churn, especially at certain temperatures, and this results in unsatisfactory whipping or foaming of the product when the product is dispensed. The purpose of the shaking process is to cause the dispensing gas to dissolve throughout the cream in the container since this must be accomplished in order to obtain the desired foaming or whipping action when the cream is dispensed and passes through the dispensing valve into the atmosphere.

An important object of the present invention is to provide a novel method and apparatus for saturating cream or other liquid products with a dispensing gas and packaging the cream or liquid product in a pressurized container without shaking or agitating the cream in a manner which might cause the cream to churn.

A further object of the present invention is to provide a novel method and apparatus whereby a liquid product saturated with a gas under pressure may be more rapidly and economically packaged in a pressurized container.

Other objects and advantages of the present invention will become apparent from the following description and the accompanying drawings wherein:

Fig. 1 is an elevational view showing an apparatus embodying the principles of the present invention;

Fig. 2 is a diagrammatic view showing means for actuating and controlling the apparatus of this invention;

Fig. 3 is an enlarged fragmentary sectional view taken along line 3—3 in Fig. 1 with a portion thereof broken away to show details of the apparatus; and Fig. 4 is an enlarged fragmentary sectional view taken along line 4—4 in Fig. 3.

In general, the process of the present invention comprises the steps of continuously mixing a quantity of a liquid product and a dispensing gas in a chamber under pressure and thereby continuously saturating the liquid product with the dispensing gas and then filling and sealing a container with a portion of the saturated liquid product while maintaining the liquid product and the interior of the container under a pressure substantially equal to the gas pressure in the above mentioned chamber. When the liquid product is cream, mixing of the product with the gas is accomplished in a manner which eliminates shaking or agitation that might cause the cream to churn, and the container is preferably evacuated before dispensing gas under pressure and the product is admitted thereto since the oxygen in the air tends to impair the flavor of the product, and air is only slightly soluble in cream and, therefore, ineffective as a dispensing gas.

Referring now more specifically to the drawings wherein like parts are designated by the same numerals throughout the various figures, an apparatus constructed in accordance with the present invention and capable of carrying out the above described process is generally designated by the numeral 10. The apparatus 10 includes a pressurized chamber or mixing tank 12 into which the liquid product is fed either continuously or intermittently through a conduit 14 from a suitable source of supply and by pump means, not shown. Dispensing gas which is usually nitrous oxide or a mixture of nitrous oxide and carbon dioxide is delivered under pressure from a suitable source, not shown, to the upper portion of the chamber through a conduit 16. Within the chamber there is mounted baffle means 18 over which the liquid product flows and is spread for thorough mixing with the gas without being violently agitated or shaken. In the embodiment shown, the baffle means comprises a plurality of vertically spaced generally dish-shaped baffles 20 having central opening means 22 through which the liquid product may flow, and a plurality of conical or dome-shaped baffles 24 for receiving the liquid product from the openings 22 and having peripheral opening means 26 through which the liquid product flows to a lower baffle 20. A substantial body of the liquid product saturated with the dispensing gas is preferably maintained within the chamber 12 beneath the baffle means at all times, and a portion of the liquid product is continuously drawn through an outlet conduit 28 connected with a centrifugal pump 30 driven by a motor 32 and recirculated through pipes 34, 36, 38, 40 and 42 to the upper end of the chamber 12 to promote uniform distribution of the gas throughout the liquid product.

The apparatus 10 includes means 44 for filling and sealing a container 46 with the previously saturated liquid product, which means includes a valve block 48 having a transverse passageway 50 therein connected with the pipe 34. The passageway 50 intersects a bore 52 in which a slide valve 54 is movably disposed. A product measuring and feed cylinder 56 is secured to the valve block 48 and communicates with the bore 52 through an aperture 58. The upper end of the cylinder is closed by a member 60, and a piston 62 is slidably disposed within the cylinder and is connected by a rod 64 to actuating means 66 which may, for example, be an air cylinder.

The slide valve 54 is shiftable from the position shown in Fig. 4 toward the right by means of an air cylinder 68 or other suitable actuating devices connected thereto by a rod 70 to a position which establishes communication between a channel or flat 72 on the valve member 54 and the passageway 50 whereby the liquid product may flow from the passageway 50 through the channel 72 and aperture 58 and into the cylinder 56. When the valve member 54 is shifted toward the right as just described, the piston 62 is raised so that a given quantity of the liquid product is drawn into the cylinder 56. When the cylinder 56 has been filled, the liquid product may be dispensed into the container 46 by shifting the valve 54 back to the position shown in Fig. 4 and lowering the piston 62 so that the product is forced out through the aperture 58 and the channel 72 to a dispensing passageway 74 provided in the valve member 54 as shown in Fig. 4.

The filling and sealing means 44 is provided with a platform 76 for supporting the container 46, which platform is mounted for vertical movement to and from the raised position shown in the drawings. In the embodiment shown, the platform 76 is mounted on a piston rod 78 actuated by an air cylinder 80. When the platform 76 is at its lower position, the container 46 having a cap or closure member 82 loosely disposed thereon is placed on the platform by any suitable means, not shown. Then the platform is raised so that the upper end of the container is inserted into a filling chamber 84 provided in the block 48 as shown best in Fig. 4. An annular seal member 86 is provided around the lower end of the chamber 84 for engaging the container and thereby sealing the chamber from the atmosphere.

In order to crimp or otherwise secure the cap or closure member to the container after the container has been filled in the manner described below, a crimping head 88 is slidably disposed within a hermetically sealed cylinder 90 secured to the block 48 and communicating with the upper end of the chamber 84. The crimping head 88 is connected with a rod 92 which is actuated by an air cylinder 94 or other suitable means and controlled in the manner described below so that the crimping head is first lowered to enable a permanent magnet 96 carried thereby to pick up the cap or closure 82 loosely positioned on top of the container and then raised to the position shown in Fig. 4 during the container filling operation and subsequently lowered to apply and seal the cap or closure to the container.

During the filling and capping operation, the filling chamber 84 is successively evacuated, filled with dispensing gas under pressure, and vented to the atmosphere. In order to accomplish this, a pipe 98 is connected with the block 48 in communication with the filling chamber 84, which pipe is connected with a vacuum line 100 having a solenoid operated shutoff valve 102 connected therein. The pipe 98 is also connected by means of a branch pipe 104 to a gas line 106 and vent conduit 108 respectively having solenoid operated shutoff valves 110 and 112 connected therein.

In order to control and actuate the apparatus described above, means such as that diagrammatically shown in Fig. 2 may be provided. More specifically, the double acting air cylinder 66 is connected with an air line 114 through a two-position valve 116 and branch conduits 118 and 120. The valve 116 is preferably spring-biased so that air under pressure is normally directed through the branch conduit 120 whereby the piston 62 is normally urged toward a raised or retracted position, and the valve is provided with solenoid means which when energized causes shifting of the valve so as to direct the air through the conduit 118. Similar solenoid controlled two-position valves 122, 124 and 126 are provided for the air cylinders 68, 80 and 94 respectively. The valve 122 is connected with a source of air under pressure by conduit 128 and is, in turn, connected with the cylinder 68 by branch conduits 130 and 132. The valve 124 is connected with an air pressure line 134 and with the air cylinder 80 by conduits 136 and 138. The valve 126 is similarly connected with an air pressure line 140 and with the air cylinder 94 through branch conduits 142 and 144. As will be understood, the air lines 114, 128, 134 and 140 may be connected with a common source of air under pressure, not shown. The solenoids of the various valves are electrically connected with timing switch means 146 which may be of any known construction capable of energizing the solenoids in predetermined timed relationship and for predetermined intervals. More specifically, the solenoid of the valve 122 is connected with the switch means by wires 148 and 150 and the solenoids of valves 124 and 116 are connected with the switch means by wires 152—154 and 156—158 respectively. The solenoid of the valve 102 is connected to the switch means by wires 160 and 162, the solenoid of valve 110 is connected to the switch means by wires 164 and 166, and the solenoid of valve 112 is connected to the switch means by wires 168 and 170.

As mentioned hereinabove, the air cylinder 94 is controlled so that the crimping head 88 is first lowered to pick up the cap or closure from a container, then raised during the filling operation and then lowered to apply and seal the closure to the container. In order to accomplish this, the solenoid of the valve 126 is connected to one switch element of the switch means 146 by a wire 172 and wires 174 and 176 having a normally closed limit switch 178 connected therebetween. The limit switch 178 is positioned as shown in Fig. 4 so that when the crimping head 88 has been lowered sufficiently to enable the magnet means 96 to pick up the cap or closure but insufficiently crimp the closure to the container, the switch will be opened thereby deenergizing the solenoid of the valve 126 and permitting the spring-biased valve to shift in a manner which causes the crimping head to be reversed or raised. The solenoid of the valve 126 is also connected to another switch element of the control switch means 146 by wires 180 and 182 which bypass the limit switch 178 so that after the filling operation has been completed, the crimping head may be actuated so as to apply the closure or cap to the container.

The method of processing and packaging a liquid product when utilizing the above described apparatus is as follows. A quantity of the liquid product and dispensing gas under pressure are introduced into the chamber 12 wherein the product is circulated and saturated with the gas in the manner described above. At this time the slide valve 54 is retracted so that the dispensing passageway 74 is blocked, and it will be noted that a seal such as an O-ring 184 or the like is provided adjacent the end of the slide valve 54 so as to preclude the leakage of any of the liquid product past the valve and into the filling chamber 84 when the valve is retracted. A container 46 having a cap or closure, which may be in the form of a dispensing cap of known construction, is placed on the platform or lifter pad 76 which has been lowered from the position shown in the drawings. Then the timing switch means 146 is energized so that the platform 76 is raised until the upper end of the can seats firmly against the seal 86 and the crimping head 88 is lowered to pick up the cap or closure 82 and then raised to the position shown in Fig. 4. Then the valve 102 is actuated so that the filling chamber 84 is connected with the vacuum line 100 and the chamber and container are evacuated. It will be appreciated that when certain liquid products which are not damaged by contact with air are being packaged, the step of evacuating the filling chamber and container may be eliminated. Then the valve 102 is closed and the valve 110 is opened to admit dispensing gas into the filling chamber and container. The gas line 106 is connected with a source of gas under a pressure which is preferably substantially equal to the gas pressure within the chamber 12 and this may conveniently be accomplished by connecting the line 106 with the upper end of the chamber. Thus, the liquid product will be maintained under substantially constant gas pressure during the filling operation so as to prevent whipping or foaming.

While the container is being readied for receiving the product in the manner described above, the piston 62 is raised so that a predetermined quantity of the liquid product is drawn into the cylinder 56. A back pressure is provided within the cylinder by connecting a gas line 186 with the upper end of the cylinder 56 and the upper end of the chamber 12 so as to counterbalance the force exerted by the gas-saturated liquid product, thus requiring a less powerful air cylinder 66, and to minimize leakage past the piston 62 and to maintain the liquid product being drawn into the cylinder under sufficient pressure to prevent whipping or foaming of the product. After the container has been charged with the gas under pressure and the cylinder 56 has been filled with the liquid product, the air cylinder 68 is actuated to shift the valve 54 to the position shown in Fig. 4 so that the dispensing passageway 74 is aligned with the open upper end of the container. Then the piston 62 is lowered to discharge a predetermined amount of the liquid product into the container. After the container is filled the slide valve 54 is retracted and the crimping head 88 is lowered to apply and seal the closure to the container. Then the valve 110 in the gas line 106 is closed and the valve 112 is opened to relieve the gas pressure within the filling chamber. If desired, however, the gas valve 110 may be closed before the crimping head is lowered so that the gas in the filling chamber and container is slightly compressed as a result of the displacement of the crimping head in the chamber. After the chamber has been vented the cylinder 80 is actuated to lower or retract the container and the above described cycle is repeated.

While the preferred embodiment of the present invention has been shown and described herein, it is obvious that many details may be changed without departing from the spirit and scope of the appended claims.

The invention is claimed as follows:

1. An apparatus for packaging a liquid product comprising chamber means, means for supplying a liquid product to said chamber means, means for supplying a gas under a predetermined super-atmospheric pressure to said chamber, baffle means within said chamber for spreading the liquid product to expose the liquid product to the gas and promote even distribution of the gas throughout the liquid product, and means for subsequently filling a container with said liquid product having gas distributed therethrough and for sealing the container while constantly maintaining the liquid product and gas under a pressure at least substantially as great as said predetermined pressure.

2. An apparatus, as defined in claim 1, wherein said baffle means comprises a vertical series of superposed shallow conical baffles, successive baffles being oppositely disposed so that a base portion of upright conical baffles substantially abut a base portion of immediately adjacent inverted conical baffles, the upright conical baffles having opening means adjacent their base portions and the inverted conical baffles having opening means adjacent their apexes so that the liquid may flow downwardly from one baffle to the next.

3. An apparatus for packaging a liquid product in a dispensing container comprising pressure chamber means, means for supplying a quantity of a liquid product into said pressure chamber means, means for supplying a dispensing gas under a predetermined super-atmospheric pressure into said pressure chamber means, means within said pressure chamber means for spreading said liquid product to promote even distribution of the gas throughout the liquid product, means for recirculating the liquid product through said pressure chamber means further to promote even distribution of the gas throughout the liquid product, means for positioning a container having a closure member loosely disposed thereon, means for lifting said closure member from a positioned container to permit filling of the container and for subsequently applying the closure member securely to the container after the container has been filled, means for introducing dispensing gas under a pressure at least substantially as great as said predetermined pressure into said container after the closure member has been lifted therefrom, and means for subsequently filling said container with a predetermined portion of said quantity of liquid product having gas distributed therethrough and maintaining the liquid product and gas under a pressure at least substantially as great as said predetermined pressure during filling of the container and subsequent application of the closure member to the container.

4. An apparatus for packaging a liquid product comprising pressure chamber structure for distributing a gas under a predetermined superatmospheric pressure throughout a quantity of a liquid product, a pump having an inlet and outlet respectively connected with spaced portions of said chamber structure for recirculating the quantity of liquid product through the chamber structure to enhance uniformity of distribution of gas throughout the liquid product, means for withdrawing a predetermined portion of the liquid product from the pressure chamber structure and for discharging said portion into a container and for sealing the container while constantly maintaining the liquid product portion and gas under a pressure at least substantially as great as said predetermined pressure, and means for supplying additional liquid product and gas under pressure at least as great as said predetermined pressure to said chamber means.

5. An apparatus for packaging a liquid product comprising means for distributing a gas under a predetermined superatmospheric pressure throughout a quantity of a liquid product, and means for subsequently filling a container with said liquid product having the gas distributed therethrough and for sealing the container while constantly maintaining the liquid product and the gas under a pressure at least substantially as great as said predetermined pressure, said last named means comprising a cylinder selectively connectable with said first named means and a container to be filled, a piston reciprocably disposed in said cylinder for drawing a portion of said product from said first named means and then discharging the product, means connected with said piston for actuating the piston, means connected with said cylinder behind said piston for maintaining a fluid back pressure behind the piston for resisting leaking and foaming of the product around the piston, and shiftable valve means for selectively connecting said cylinder with said first mentioned means and with a container to be filled.

6. An apparatus, as defined in claim 5, wherein said shiftable valve means comprises a valve body including bore means therein having an open end, said body having a first port communicating with said bore means and with said means for distributing gas under pressure through a liquid product, said valve body having a second port communicating with said piston and with said bore means and spaced axially of the bore means from said first port, and a shiftable valve stem in said bore means, said valve stem being movable from a first position in which an end thereof projects from said open end of the bore means to a second position in which said end of the valve stem is disposed within said bore means, said stem including passageway means therein for connecting said first and second ports only when the valve stem is in said second position and for connecting said second port and a container to be filled adjacent said open end of the bore means only when said valve stem is in said first position.

References Cited in the file of this patent

UNITED STATES PATENTS

| | | |
|---|---|---|
| 2,227,101 | Meyer | Dec. 31, 1940 |
| 2,684,805 | McBean | July 27, 1954 |
| 2,723,200 | Pyenson | Nov. 8, 1955 |
| 2,757,843 | Smith | Aug. 7, 1956 |
| 2,874,523 | Ryan | Feb. 24, 1959 |